US010124357B2

(12) United States Patent
Good et al.

(10) Patent No.: US 10,124,357 B2
(45) Date of Patent: Nov. 13, 2018

(54) DIP TUBE CONNECTORS AND PUMP SYSTEMS USING THE SAME

(75) Inventors: Robert J. Good, Lee's Summit, MO (US); David L. Dejong, Ogden, UT (US); Joseph R. Krestine, Leawood, KS (US)

(73) Assignee: SILGAN DISPENSING SYSTEMS CORPORATION, Grandview, MO (US)

( * ) Notice: Subject to any disclaimer, the term of this patent is extended or adjusted under 35 U.S.C. 154(b) by 0 days.

(21) Appl. No.: 13/408,499

(22) Filed: Feb. 29, 2012

(65) Prior Publication Data

US 2012/0234872 A1 Sep. 20, 2012

Related U.S. Application Data

(63) Continuation of application No. 13/068,875, filed on Mar. 15, 2011.

(51) Int. Cl.
*B05B 11/02* (2006.01)
*F16L 55/00* (2006.01)
*B05B 11/00* (2006.01)
*B05B 15/30* (2018.01)

(52) U.S. Cl.
CPC ....... *B05B 11/3011* (2013.01); *B05B 11/0044* (2018.08); *B05B 11/0089* (2013.01); *B05B 11/3045* (2013.01); *B05B 11/3047* (2013.01); *B05B 15/30* (2018.02); *B05B 11/0037* (2013.01)

(58) Field of Classification Search
CPC ............. B05B 11/3001; B05B 11/3011; B05B 11/3047; B05B 11/3057; B05B 11/3074
USPC ..... 222/382, 383.1, 464.1, 321.7–321.9, 211
See application file for complete search history.

(56) References Cited

U.S. PATENT DOCUMENTS

| | | | | |
|---|---|---|---|---|
| 3,575,949 A | | 4/1971 | Humphrey | |
| 4,101,041 A | | 7/1978 | Mauro, Jr. | |
| 4,157,774 A | * | 6/1979 | Micallef | 222/321.9 |
| 4,600,130 A | | 7/1986 | Libit | |
| 4,863,071 A | * | 9/1989 | Guss et al. | 222/207 |
| RE33,480 E | * | 12/1990 | Guss et al. | 222/207 |
| 5,192,007 A | * | 3/1993 | Blomquist | 222/376 |
| 5,244,126 A | | 9/1993 | Geier | |
| 5,246,146 A | * | 9/1993 | Bartimes et al. | 222/382 |
| 5,303,851 A | | 4/1994 | Libit | |
| 5,335,821 A | | 8/1994 | Osgar | |

(Continued)

FOREIGN PATENT DOCUMENTS

EP 2020264 A2 * 2/2009 ............ B05B 11/00

OTHER PUBLICATIONS

International Search Report dated Oct. 1, 2012 for PCT/US2012/029468.

(Continued)

*Primary Examiner* — Nicholas J Weiss
(74) *Attorney, Agent, or Firm* — Barlow Josephs and Holmes Ltd

(57) ABSTRACT

A pump system may include a blown-in dip tube connected to a valve body and having a connection which may include an improved blown-in dip tube connector having one or more of a lip for sealing with a blown-in dip tube, a seal ring configured to mate with a blown-in dip tube and seal therewith, a dip tube lock for mating with a blown-in dip tube, or an o-ring for providing an improved seal with a blown-in dip tube.

4 Claims, 14 Drawing Sheets

(56) References Cited

U.S. PATENT DOCUMENTS

| | | | | |
|---|---|---|---|---|
| 5,464,129 | A | 11/1995 | Ho | |
| 5,590,815 | A * | 1/1997 | Montaner et al. | 222/82 |
| 5,638,994 | A * | 6/1997 | Libit et al. | 222/207 |
| 5,667,104 | A | 9/1997 | Meshberg | |
| 6,102,255 | A * | 8/2000 | Ellion | 222/321.4 |
| 6,213,358 | B1 | 4/2001 | Libit | |
| 6,364,172 | B1 * | 4/2002 | Maas et al. | 222/383.1 |
| 6,378,739 | B1 * | 4/2002 | Maas et al. | 222/383.1 |
| 6,659,311 | B2 | 12/2003 | Prueter | |
| 6,669,061 | B2 * | 12/2003 | Tada | 222/383.1 |
| 6,789,303 | B2 * | 9/2004 | Maas et al. | 29/453 |
| 7,455,198 | B2 * | 11/2008 | Foster et al. | 222/383.1 |
| 7,490,743 | B2 * | 2/2009 | Herzog | 222/321.7 |
| 7,497,358 | B2 * | 3/2009 | Clynes et al. | 222/340 |
| 7,571,836 | B2 * | 8/2009 | Foster et al. | 222/340 |
| 7,637,396 | B2 * | 12/2009 | Foster et al. | 222/340 |
| 7,712,636 | B2 * | 5/2010 | Foster et al. | 222/340 |
| 7,938,299 | B2 | 5/2011 | Fahy et al. | |
| 8,038,040 | B2 * | 10/2011 | Dennis | 222/464.1 |
| 8,066,155 | B2 * | 11/2011 | Tada | 222/383.1 |
| 8,074,846 | B2 * | 12/2011 | Allegaert | 222/382 |
| 2002/0066802 | A1 | 6/2002 | Tada | |
| 2006/0086762 | A1 | 4/2006 | Foster et al. | |
| 2006/0289679 | A1 * | 12/2006 | Johnson et al. | 239/333 |
| 2007/0290005 | A1 * | 12/2007 | Foster et al. | 222/383.1 |
| 2008/0121664 | A1 * | 5/2008 | Ophardt et al. | 222/321.9 |
| 2009/0212077 | A1 * | 8/2009 | Carden | 222/382 |
| 2010/0096414 | A1 | 4/2010 | Dennis | |
| 2010/0096415 | A1 | 4/2010 | Dennis | |
| 2011/0036927 | A1 * | 2/2011 | Hensen | 239/302 |
| 2011/0049191 | A1 * | 3/2011 | Crawford et al. | 222/382 |
| 2011/0108447 | A1 | 5/2011 | Hoefing | |
| 2011/0108581 | A1 * | 5/2011 | Dennis | 222/382 |
| 2011/0121039 | A1 | 5/2011 | Dennis | |
| 2011/0163184 | A1 | 7/2011 | Dennis | |
| 2012/0006856 | A1 * | 1/2012 | Dennis | 222/382 |
| 2012/0018458 | A1 * | 1/2012 | Chernik et al. | 222/382 |

OTHER PUBLICATIONS

Unsolicited letter received from Mr. George T. Schooff, Esq. of Harness, Dickey & Pierce, P.L.C., dated Apr. 26, 2013 and related to U.S. Appl. No. 13/408,499.

Unsolicited letter received from Mr. George T. Schooff, Esq. of Harness, Dickey & Pierce, P.L.C. dated Apr. 26, 2013 and related to U.S. Appl. No. 13/068,875.

* cited by examiner

DIP TUBE CONNECTORS AND PUMP SYSTEMS USING THE SAME

CROSS-REFERENCE TO RELATED APPLICATIONS

This application is a continuation of U.S. application Ser. No. 13/068,875 entitled "DIP TUBE CONNECTORS AND PUMP SYSTEMS USING THE SAME," filed on 15 Mar. 2011 as U.S. Provisional Application No. 61/452,854, for which conversion to a non-provisional application was granted, resulting in U.S. application Ser. No. 13/068,875; each of U.S. Provisional Application No. 61/452,854 and U.S. application Ser. No. 13/068,875 are incorporated herein by reference in their entireties.

BACKGROUND OF THE INVENTION

Field of the Invention

Embodiments of the invention relate to dip tube connectors and dip tube connection systems for connecting pumps with containers or bottles having dip tubes integrated therewith.

State of the Art

Conventional pump spray systems, such as trigger sprayers or fine mist sprayers, typically employ dip tubes as a means for transporting fluid or product from an interior of a container or bottle to the pump sprayer. While the use of dip tubes is predominant in the industry, there have been attempts to eliminate the dip tube. For example, U.S. Pat. No. 4,863,071, which is incorporated herein by reference, discloses a container and pump unit where the container is formed with an integral liquid supply tube in lieu of a dip tube. Similarly, United States Patent Application 2010/0096415A1, which is incorporated herein by reference, discloses a fluid dispensing container having a bottle and fluid withdrawing assembly for liquids wherein the bottle includes an integral dip tube and the fluid dispensing mechanism may be aligned to allow a direct connection between the integral dip tube and the fluid dispensing mechanism. In each of these examples, the connection between the blown-in dip tube of the bottle or container and the pump spray systems appear to be simple tubes. For instance, the trigger supply lines (34 and 46) described and illustrated in U.S. Patent App. 2010/0096415A1 appear to be nothing more than a tube which slides into a blown-in dip tube.

While the simple engagement of a trigger supply line with a blown-in dip tube may be useful, there may be other instances where more robust fitments between a blown-in dip tube and pump system are needed. In addition, configurations or adaptations which may allow a container or bottle having a blown-in dip tube to be fitted with a traditional trigger sprayer or pump system may be advantageous. Furthermore, improvements in a fitment between a pump sprayer system and a blown-in dip tube may be advantageous.

BRIEF SUMMARY OF THE INVENTION

According to certain embodiments of the invention, a pump system for pumping a liquid through a container or a bottle having a blown-in dip tube may include an improved blown-in dip tube connector. An improved blown-in dip tube connector may include a flexible blown-in dip tube connector. An improved blown-in dip tube connector may also be configured to snap fit or otherwise attach to a valve body of a pump system, to a valve retainer of a pump system, or to a combination of a valve retainer and valve body. In some embodiments, a connection between the blown-in dip tube connector and a blown-in dip tube of a bottle or container may include one or more features configured to retain the blown-in dip tube connector in a blown-in dip tube or to improve a seal between the blown-in dip tube connector and a blown-in dip tube.

For instance, according to certain embodiments of the invention, a blown-in dip tube connector may include a fluid inlet at one end configured to mate with a blown-in dip tube. The blown-in dip tube connector may include one or more dip tube lips configured to mate with a portion of the blown-in dip tube and to provide an improved seal between the blown-in dip tube and blown-in dip tube connector.

In other embodiments of the invention, a blown-in dip tube connector may include one or more seal rings configured to facilitate a seal between a blown-in dip tube connector and a blown-in dip tube when the blown-in dip tube connector is mated with a blown-in dip tube. The one or more seal rings may sit on a seat formed in the blown-in dip tube and may be further retained in position by lips, detents, or other features configured to facilitate a sealed connection between the blown-in dip tube connector and blown-in dip tube. According to certain embodiments of the invention, a seal ring may be bi-injected with the blown-in dip tube connector or may be formed or attached to the blown-in dip tube connector during an assembly process. In some embodiments of the invention, a seal ring material may include a plastic, elastomer, or flexible material. In some embodiments, for example, a seal ring may be made of a thermoplastic elastomer, a thermoplastic urethane or polyurethane, silicon, rubber, or other material.

In still other embodiments of the invention, a blown-in dip tube connector may include one or more dip tube locks which may mate with a detent, lip, or other feature of a blown-in dip tube. A dip tube lock may include a recess, lip, or combination thereof formed in a portion of the blown-in dip tube connector near a fluid inlet thereof. The recess, lip, or combination may be configured to snap lock with a feature on a blown-in dip tube.

In still other embodiments of the invention, a blown-in dip tube connector having one or more dip tube locks may also be fitted with an o-ring or other feature to secure a fluid inlet of the blown-in dip tube connector with a blown-in dip tube. For instance, an o-ring may be seated about a dip tube lock such that when the fluid inlet end of a blown-in dip tube connector is inserted in a blown-in dip tube of a container or bottle, the o-ring may form a seal with the sides of the blown-in dip tube. The seal formed between an o-ring and the side of the blown-in dip tube may provide an improved seal between the blown-in dip tube connector and the blown-in dip tube.

According to various embodiments of the invention, a blown-in dip tube connector may be made of a plastic material. For example, a blown-in dip tube connector may be molded using a high-density polyethylene or medium-density polyethylene. Other materials may also be used as desired.

In various embodiments of the invention, a blown-in dip tube connector may be attached to, or assembled with, a pump system 100 in any number of ways. In some embodiments, for example, a blown-in dip tube connector may include one or more connector lips which may mate with one or more connectors of a valve body to secure the blown-in dip tube connector to the valve body. In other embodiments of the invention, a blown-in dip tube connector may be mated with a valve retainer, or ball retainer, such that the blown-in dip tube connector and valve retainer form a unitary part that may be assembled with a valve body. In such instances, the valve body may be configured to secure the valve retainer, the blown-in dip tube connector, or both.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

DETAILED DESCRIPTION OF THE INVENTION

According to various embodiments of the invention, a blown-in dip tube connector may be fitted to, integrated with, or otherwise assembled with a pump sprayer to facilitate the use of the pump sprayer with a container or bottle having a blown-in dip tube. The integration or fitment of the blown-in dip tube connector with a pump sprayer may allow the pump sprayer to be removed from the container or bottle. The integration or fitment of the blown-in dip tube connector with a pump sprayer may also allow the pump sprayer to be removed from the container or bottle and then refitted to the container or bottle as desired. Thus, various embodiments of the invention may be used with pump systems designed to be used on refillable bottles or containers.

Figure 1:
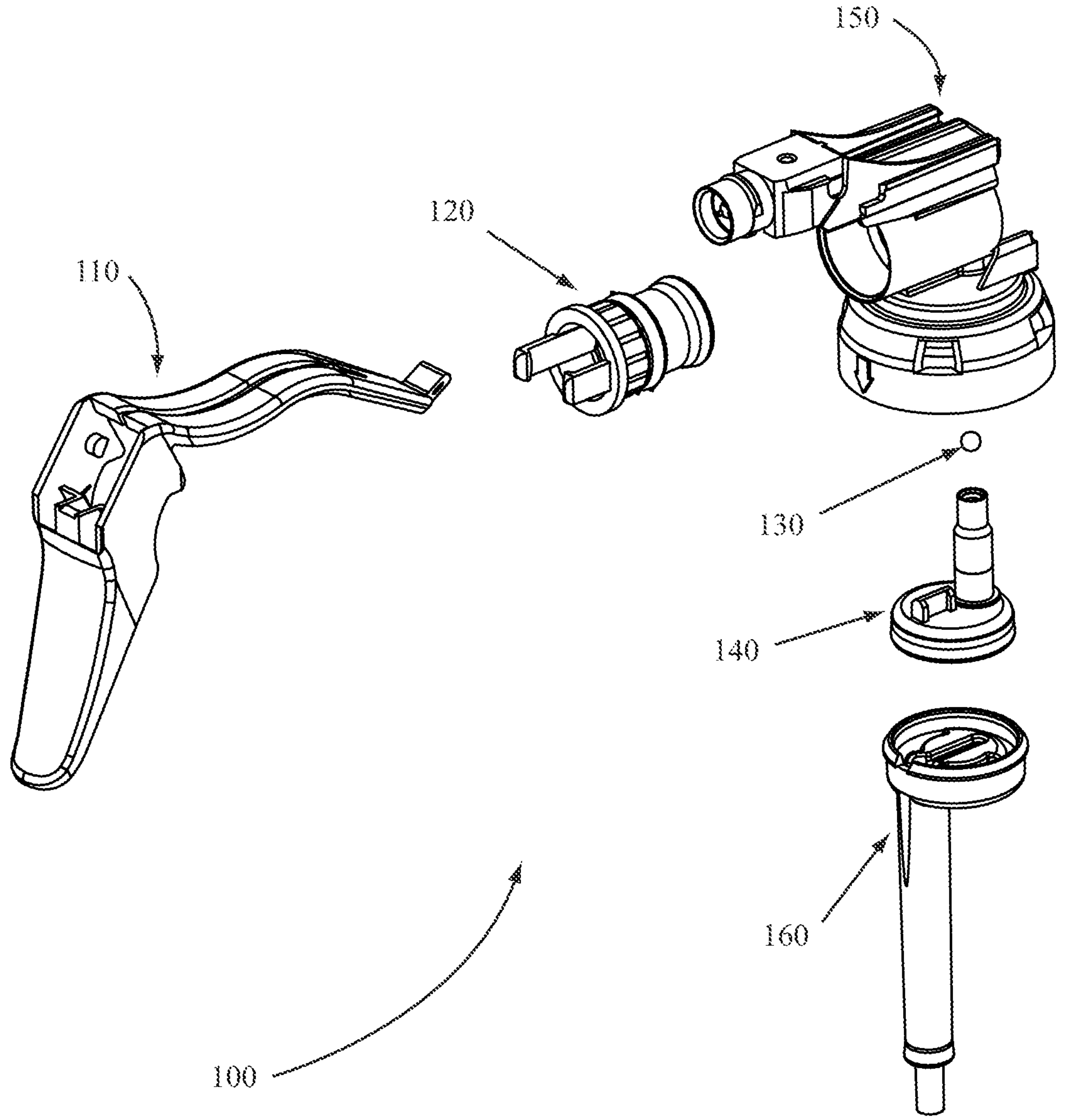
FIG. 1 illustrates various components of a pump system according to embodiments of the invention.

A pump system 100 according to various embodiments of the invention is illustrated in FIG. 1. As illustrated, a pump system 100 may include a trigger sprayer system. The trigger sprayer, or pump system 100, illustrated in FIG. 1 may include a valve body 150, a piston 120, an integrated trigger and spring 110, a ball valve 130, a ball retainer 140 and a blown-in dip tube connector 160. The pump system 100 may also include a container 900 or bottle having a blown-in dip tube 960 and the container 900 may include a product therein.

Figure 2:
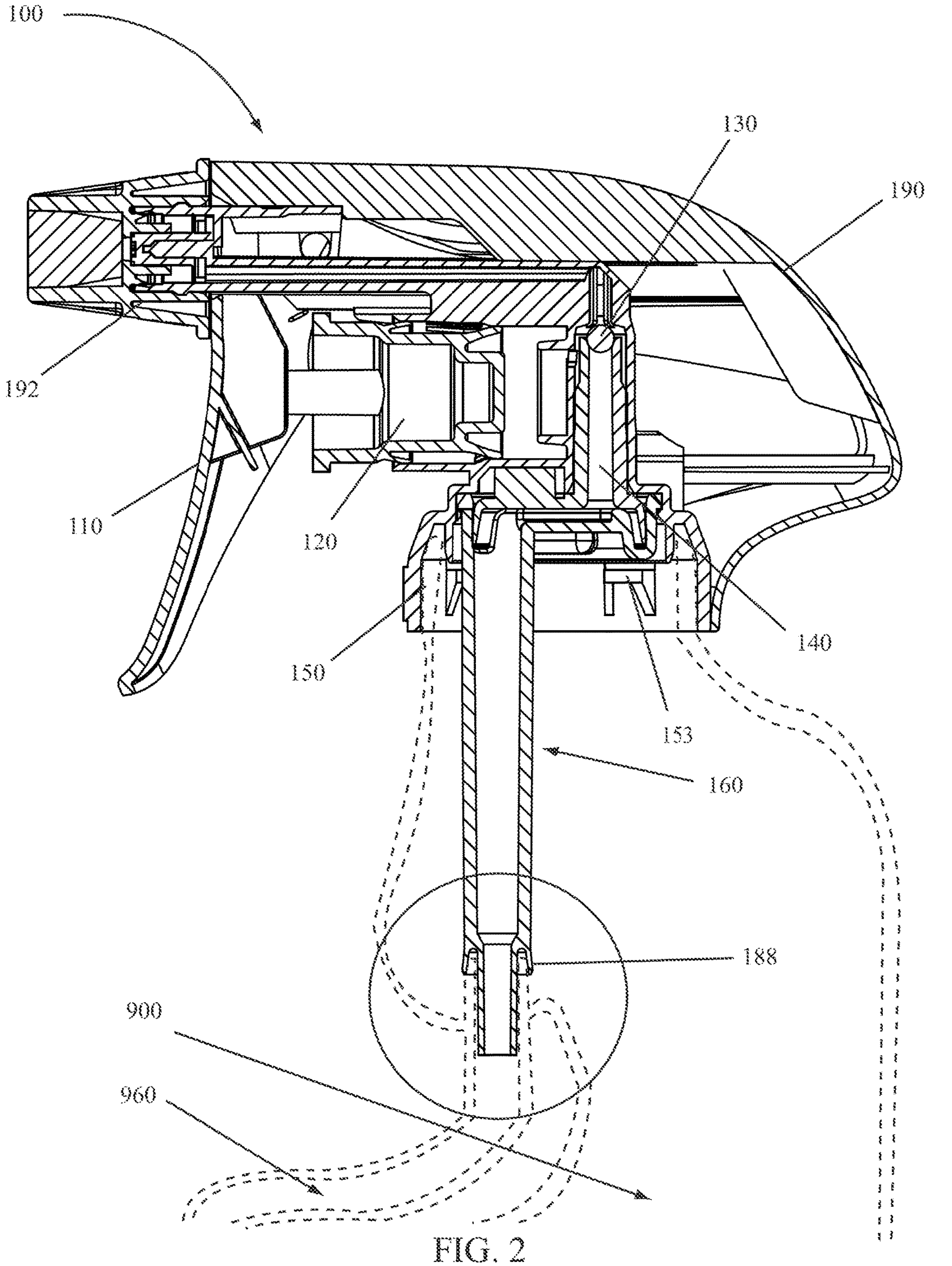
FIG. 2 illustrates a cross-sectional view of a trigger sprayer pump system according to various embodiments of the invention.

A cross-sectional view of an assembled pump system 100 according to various embodiments of the invention is illustrated in FIG. 2. A container or bottle 900 having a blown-in dip tube 960 is illustrated in dashed lines for reference. While a particular bottle 900 shape is illustrated, embodiments of the invention are not limited by the illustrated shape and may be used with any container or bottle 900 having a blown-in dip tube 960.

As illustrated in FIG. 2, the pump system 100 may include a trigger sprayer having a valve body 150, a ball valve 130 and a ball retainer 140 assembled in an interior space of the valve body 150, and a blown-in dip tube connector 160 in communication with the ball retainer 140. A pump system 100 may also include a shroud 190 and a nozzle 192. An integrated trigger and spring 110 may be assembled such that the piston 120 may be actuated by actuation of the trigger portion of the integrated trigger and spring 110. In other embodiments of the invention, an integrated trigger and spring 110 may be substituted by separate trigger and spring components wherein the separate spring component may bias either the separate trigger component or piston to allow return movement of the piston following an actuation of the pump system 100.

A valve body 150 for a pump system 100 according to embodiments of the invention may include any conventional valve body. Examples of valve bodies 150 which may be used with various embodiments of the invention are illustrated in FIGS. 1, 2, and 18 through 21. As illustrated, a valve body 150 may include a bayonet connection system 153 for connecting the valve body 150 or pump system 100 to a bottle. For instance, a bayonet connection system such as that described in U.S. Pat. No. 5,845,820, which is incorporated herein by reference in its entirety, may be used with embodiments of the invention. Other bayonet or snap-on type connector systems may also be used with embodiments of the invention. Alternatively, a valve body 150 may include a conventional threaded screw system (not shown) wherein a threaded connection element may be assemble to or with the valve body such that the valve body 150 may be connected and sealed to a bottle or container. In some instances, where a threaded closure system is used, a retainer seal or retainer ring may also be used to assure that the connection between a container or bottle and the valve body 150 does not leak.

A valve body 150 used with embodiments of the invention may include a vent. According to some embodiments, a vent may include a vent connection 152 as illustrated in FIGS. 18 through 21. The vent connection 152 may connect an interior portion of a piston chamber 151 with an interior portion of the valve body 150 which is in communication with the interior of a bottle or container when the pump system 100 is connected thereto. When a piston 120 passes a certain location within the piston chamber 151, air may pass through the vent connection 152 and into the container or bottle.

A valve body 150 may also include a fluid passageway 156. According to some embodiments of the invention, fluid passing through a blown-in dip tube connector 160 may pass into the fluid passageway 156 and into the piston chamber 151. In other embodiments of the invention, a fluid passageway 156 may be configured to accept and hold or retain a ball retainer 140 assembled with the valve body 150. In such instances, fluid passing from a container through the blown-in dip tube 160 may pass through that portion of the ball retainer 140 assembled in the fluid passageway 156.

In some embodiments of the invention, a valve body 150 may include one or more connectors 159. The one or more connectors 159 may be configured to mate with, snap with, fix, or otherwise retain a blown-in dip tube connector 160 with the valve body 150. In some embodiments, the one or more connectors 159 may fit with corresponding features of a blown-in dip tube connector 160 such that the blown-in dip tube connector 160 is maintained in a fixed position with respect to the valve body 150. In other embodiments of the invention, the one or more connectors 159 may fit with corresponding features of a blown-in dip tube connector 160 such that the blown-in dip tube connector 160 may rotate or swivel relative to the valve body 150. For example, the one or more connectors 159 may include a snap ring configured to retain one or more connector lips 165 or connector tabs 175.

According to various embodiments of the invention, a valve for the pump system 100 may include a ball valve 130 moveably fixed on an interior of the valve body by a ball retainer 140 as illustrated in FIG. 2. A ball valve 130 may be assembled in a portion of the fluid passageway 156 of a valve body and a ball retainer 140 may be fitted in a portion of the fluid passageway 156 such that the ball valve 130 is retained in the valve body 150. In some embodiments of the invention, the ball retainer 140 may be snap fitted into a fluid passageway 156 portion of the valve body 150. In other embodiments, the ball retainer 140 and valve body 150 may include complimentary fasteners or features for holding and retaining the ball retainer 140 within a fluid passageway 156 of the valve body 150. In still other embodiments of the invention, a ball retainer 140 may include one or more seal rings which may mate with or seal with an interior portion of a blown-in dip tube retainer 160 such that the blown-in dip tube retainer 160 and ball retainer 140 may be assembled as a single piece and then assembled with a valve body 150 wherein either the blown-in dip tube connector 160 or ball retainer 140 mate with or connect to the valve body 150.

In some embodiments of the invention, the ball retainer 140 may also be configured as a dip tube retainer such that a conventional dip tube may be retained by the ball retainer 140 as well. In such configurations, a blown-in dip tube connector 160 would not be utilized. However, the option to dual purpose a ball retainer 140 as both a retainer for the ball valve 130 and as a dip tube retainer may allow a single part to be made for pump systems 100 being used with both traditional dip tube systems and for systems employing containers or bottles having blown-in dip tubes.

While various embodiments of the invention are illustrated with a ball valve 130, it is understood that other valve systems may be incorporated with various embodiments of the invention. For example, a double valve element as described in U.S. Pat. No. 6,641,003, which patent is incorporated herein by reference in its entirety, may be employed with various embodiments of the invention. In such embodiments, the double valve element may be positioned and retained in the fluid passageway 156. In still other embodiments of the invention, a valve system such as that described and illustrated in U.S. Pat. No. 7,175,056, which patent is incorporated by reference herein in its entirety, may be used with a valve body 150 and the pump system 100 having a blown-in dip tube connector 160 may be configured appropriately to utilize such a valve system.

A pump system 100 according to various embodiments of the invention may also include a shroud 190 attached to the valve body 150 or other portion of the pump system 100 as conventionally known. In addition, the pump system 100 may include a nozzle 192 fitted to the valve body 150 as conventionally known.

According to various embodiments of the invention, a pump system 100 may include a blown-in dip tube connector 160. Various configurations for blown-in dup tube connections are illustrated in FIGS. 1 through 17.

A blown-in dip tube connector 160 according to various embodiments of the invention is illustrated in FIGS. 3 through 8. As illustrated, the blown-in dip tube connector 160 may include a fluid inlet 161, a fluid flow path 162, and a connector head 164. The fluid flow path 162 may be bounded on either end by the inlet 161 and an outlet 167. During operation of a blown-in dip tube connector 160, fluid may pass from a blown-in dip tube through the inlet 161 into the fluid path 162 and out the outlet 167 into a fluid flow chamber 166 in the connector head 164. Fluid passing into the fluid flow chamber 166 may pass into a ball retainer 140 and be pumped through the pump system 100.

According to certain embodiments of the invention, a blown-in dip tube connector 160 may include one or more connector lips 165 about a periphery of a connector head 164 as illustrated in FIGS. 3 through 8. A connector lip 165 may be configured to snap-fit or otherwise mate with one or more connectors 159 on a valve body 150 such that the blown-in dip tube connector 160 may be fitted with or retained with a valve body 150. In some embodiments of the invention, the fitment of the one or more connector lips 165 with a connector 159 of a valve body 150 may allow movement of the blown-in dip tube connector 160, such as a swiveling movement. In other embodiments, the fitment of the one or more connector lips 165 with the valve body 150 may hold the blown-in dip tube connector 160 in a fixed position with respect to the valve body 150. When a blown-in dip tube connector 160 is fitted to a valve body 150, the blown-in dip tube connector 160 may also mate with or seal with a ball retainer 140. The positioning of the blown-in dip tube 160 with the ball retainer 140 may be such that the connector head 164 and ball retainer 140 may be sealed together such that fluid passing through the fluid flow chamber 166 will not leak.

According to some embodiments of the invention, the blown-in dip tube connector 160 may also include one or more seal rings 163 which may mate with, contact, or otherwise facilitate a fluid tight seal between the blown-in dip tube connector 160 and a blown-in dip tube of a bottle or container. As a comparison, prior art having tubes which are inserted or snapped directly into a blown-in dip tube may not make a sufficient seal with the blown-in dip tube. In such instances, the necessary vacuum between a pump system and the blown-in dip tube may be lost, which may result in a loss of prime for the pump system. In other instances, the loss of prime may not be recoverable if a seal between a tube and a blown-in dip tube is lost. Thus, the inclusion of one or more seal rings 163 on a blown-in dip tube connector may improve the seal of the blown-in dip tube connector 160 with a blown-in dip tube. The improved seal between the blown-in dip tube connector 160 and a blown-in dip tube may result in improved functionality and reliability of a pump system 100 utilizing a blown-in dip tube container or bottle. In addition, the inclusion of one or more seal rings 163 with embodiments of the invention allows a more robust and repeatable seal between the blown-in dip tube connector and a blown-in dip tube when pump systems 100 according to embodiments of the invention are used with refillable bottles or containers where the pump system 100 may be attached and detached from a container or bottle having a blown-in dip tube multiple times.

Figure 23:
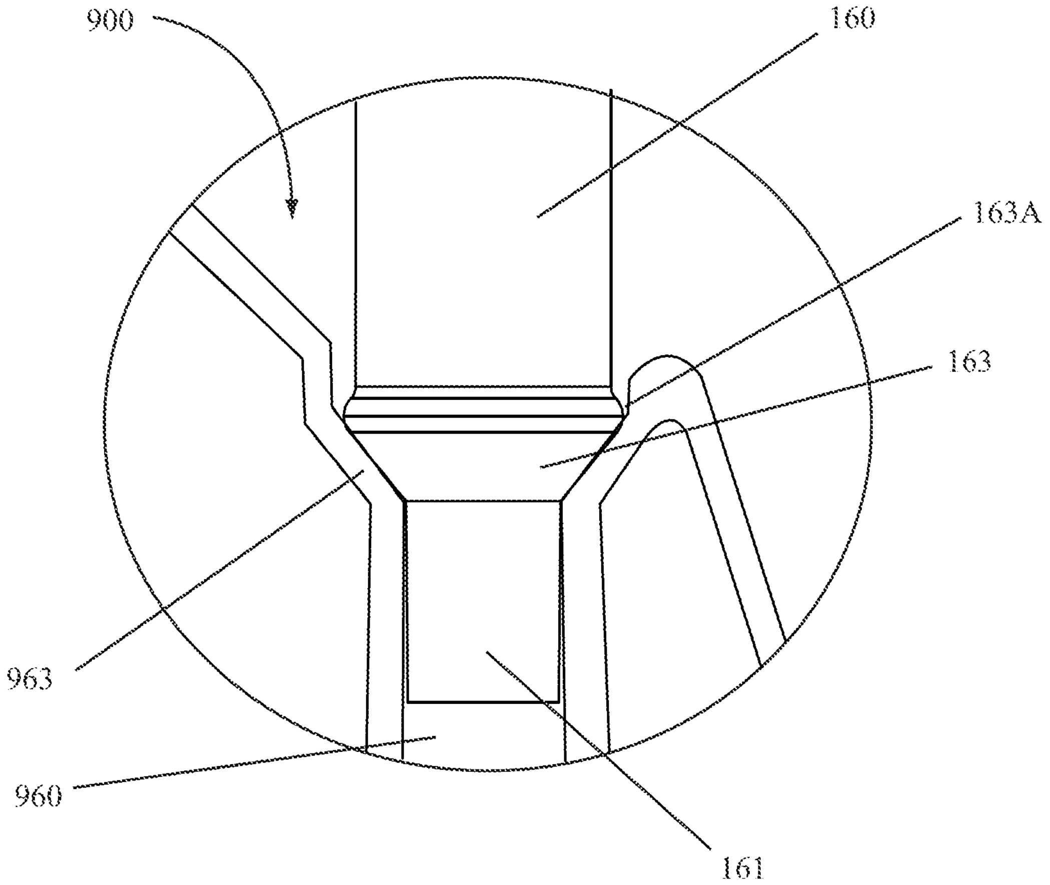
FIG. 23 illustrates a close-up view of a connection between the blown-in dip tube connector illustrated in FIG. 6 and a blown-in dip tube according to various embodiments of the invention.

For example, a blown-in dip tube connector 160 mated with a blown-in dip tube 960 of a container or bottle 900 according to certain embodiments of the invention is illustrated in FIG. 23. As shown, a fluid inlet 161 portion of a blown-in dip tube connector 160 may be positioned in a blown-in dip tube 960 of a bottle 900. One or more seal rings 163 of the blown-in dip tube connector 160 may mate with or seal with a blown-in dip tube seat 963. According to some embodiments of the invention, the one or more seal rings 163 may include one or more lips 163A which may snap into one or more detents or snap fitments on a blown-in dip tube seat 963 to facilitate retention of the blown-in dip tube connector 160 with the blown-in dip tube 960. The one or more seal rings 163 may provide a fluid tight seal between the blown-in dip tube connector 160 and the blown-in dip tube 960 of a bottle 900.

Figure 3:
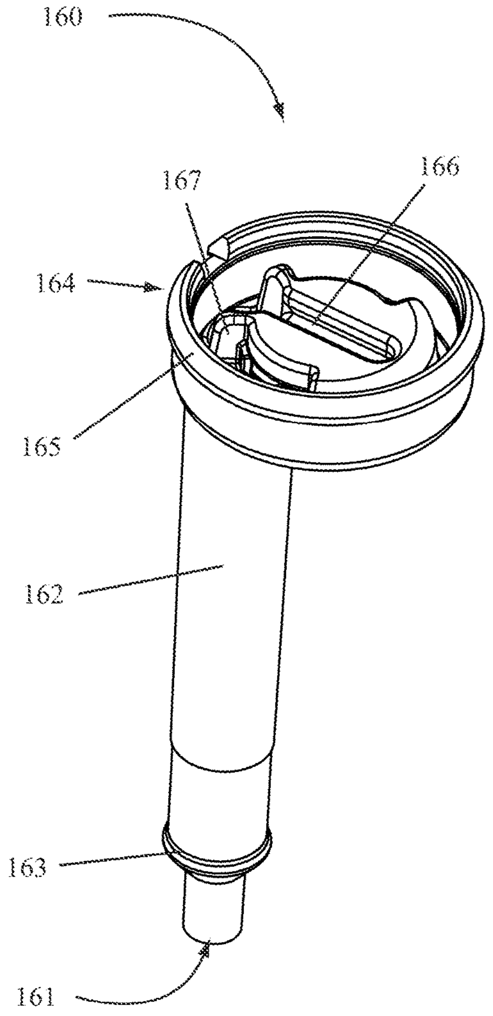
FIG. 3 illustrates a perspective view of a blown-in dip tube connector according to various embodiments of the invention.
Figure 4:
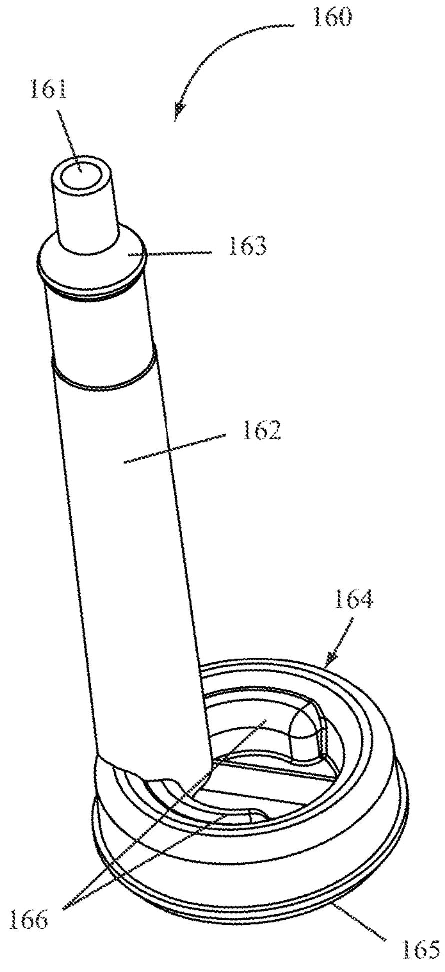
FIG. 4 illustrates a perspective view of a blown-in dip tube connector according to various embodiments of the invention.

As illustrated in FIGS. 3 and 4, the fluid inlet 161 portion of the blown-in dip tube 160 may have a smaller diameter than the flow path 162. In some embodiments, a smaller diameter in the fluid inlet 161 may facilitate a better seal between a blown-in dip tube connector 160 and a blown-in dip tube. For instance, as illustrated in FIG. 23, the fluid inlet 161 may seat in a portion of the blown-in dip tube 960 such that a seal is formed between the outer circumference of the fluid inlet 161 and the inner circumference of the blown-in dip tube 960. The presence of the one or more seal rings 163 on the blown-in dip tube seat 963 may provide an improved seal for the pump system 100.

According to various embodiments of the invention, the one or more seal rings 163 may be made of any desirable material. For example, a seal ring may be made of a thermoplastic elastomer, a thermoplastic urethane or polyurethane, silicon, rubber, or other material. However, in many instances, selection of a material may be made such that the one or more seal rings 163 are compatible with a fluid flowing through the blown-in dip tube connector 160. In some embodiments, the one or more seal rings 163 may be bi-injected with the blown-in dip tube connector 160. In other embodiments, the one or more seal rings 163 may be sprayed on, glued, press-fit, or otherwise connected to a blown-in dip tube connector 160. In addition, in some embodiments a material compatible with the one or more seal rings 163 may be applied to the blown-in dip tube seat 963 to improve the seal between the one or more seal rings 163 and the blown-in dip tube seat 963.

Figure 5:
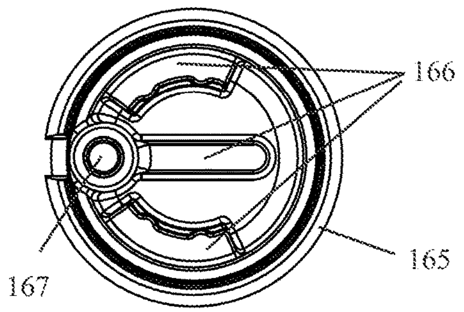
FIG. 5 illustrates a top view of a blown-in dip tube connector according to various embodiments of the invention.
Figure 7:
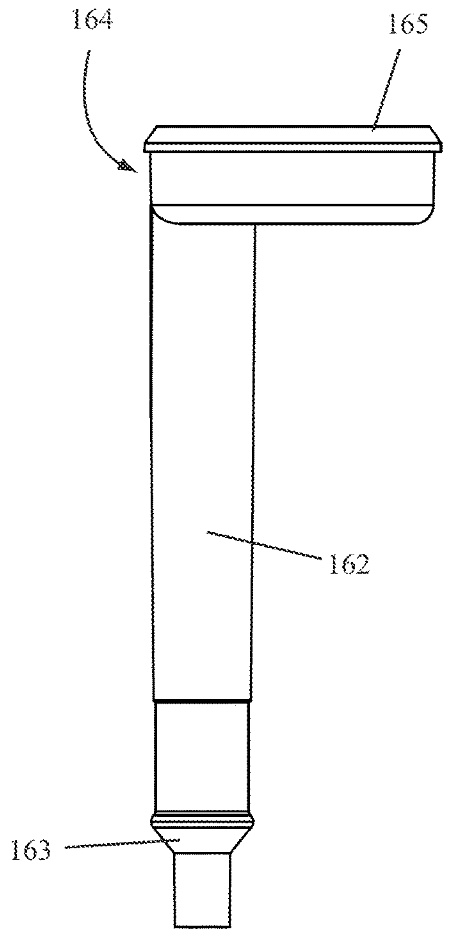
FIG. 7 illustrates a side view of a blown-in dip tube connector according to various embodiments of the invention.
Figure 6:
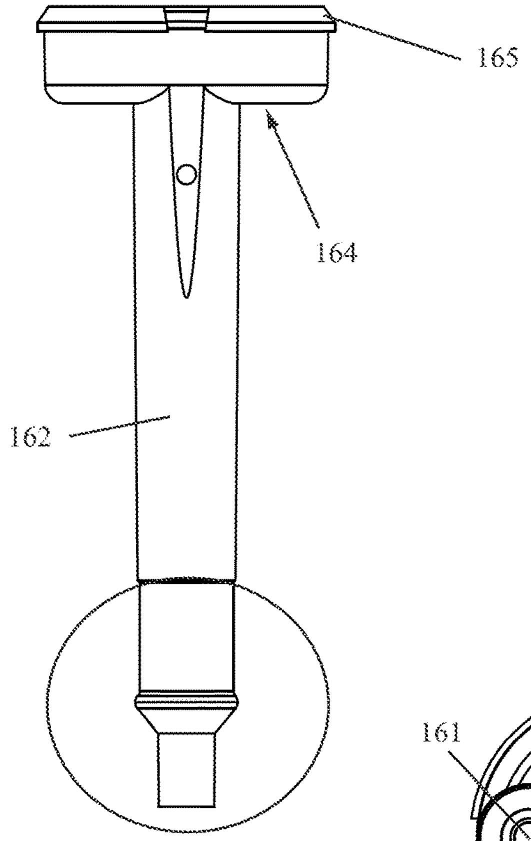
FIG. 6 illustrates a front view of a blown-in dip tube connector according to various embodiments of the invention.
Figure 8:
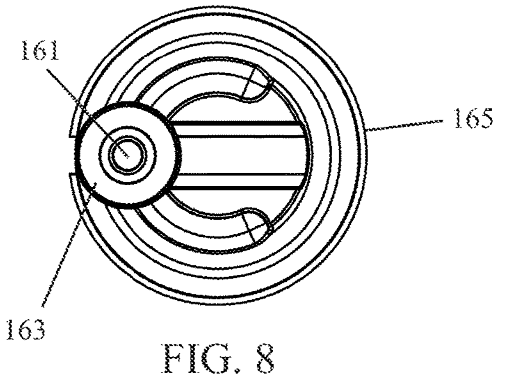
FIG. 8 illustrates a bottom view of a blown-in dip tube connector according to various embodiments of the invention.
Figure 9:
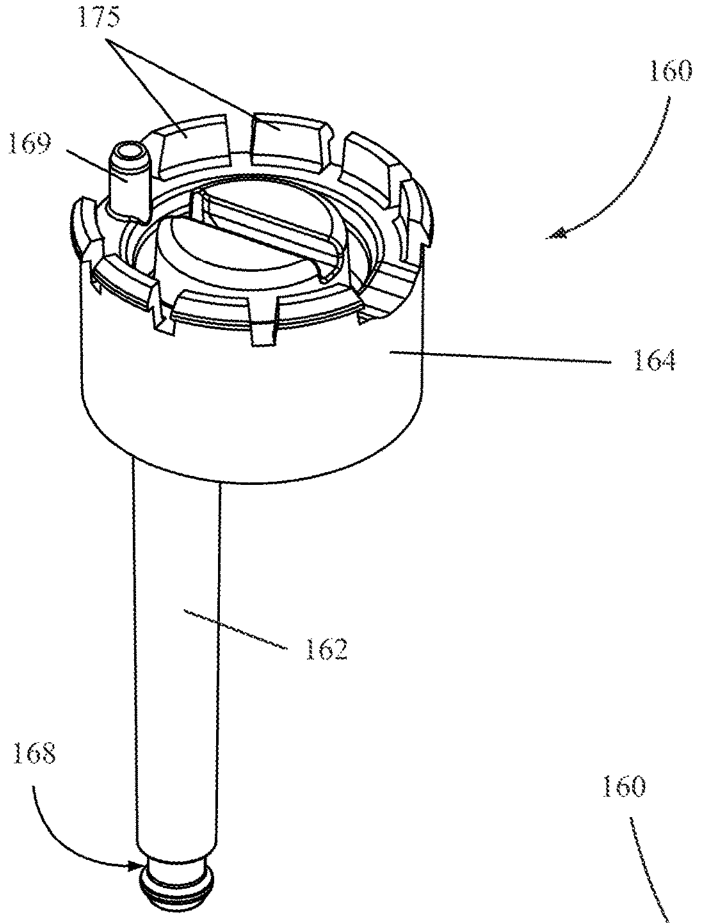
FIG. 9 illustrates a perspective view of a blown-in dip tube connector according to various embodiments of the invention.
Figure 10:
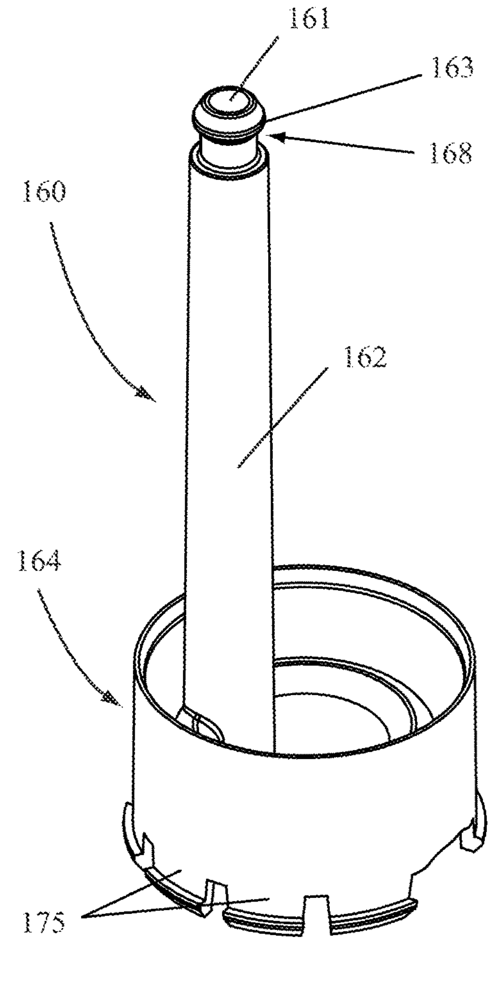
FIG. 10 illustrates a perspective view of a blown-in dip tube connector according to various embodiments of the invention.

A top view of a blown-in dip tube connector 160 is illustrated in FIG. 5. As illustrated, one or more connector lips 165 may rim at least a portion of the connector head 164. A fluid outlet 167 may open into a fluid flow chamber 166. While a particular shape and configuration for the fluid flow chamber 166 is illustrated, it is understood that other configurations could also be used. Front and side views of a blown-in dip tube connector 160 are illustrated in FIGS. 6 and 7 and a bottom view of the same illustrated in FIG. 8.

A blown-in dip tube connector 160 according to other embodiments of the invention is illustrated in FIGS. 9 through 15. As illustrated, a blown-in dip tube connector 160 may include a fluid inlet 161, a fluid flow path 162, and a connector head 164. The fluid flow path 162 may be bounded on either end by the inlet 161 and an outlet 167. During operation of a blown-in dip tube connector 160, fluid may pass from a blown-in dip tube through the inlet 161 into the fluid path 162 and out the outlet 167 into a fluid flow chamber 166 in the connector head 164. Fluid passing into the fluid flow chamber 166 may pass into a ball retainer 140 and be pumped through the pump system 100. The blown-in dip tube connector 160 may also include one or more vent passages 169.

According to embodiments of the invention, a blown-in dip tube connector 160 as illustrated in FIGS. 9 through 15 may connect to a valve body 150, ball retainer 140 or both a valve body 150 and ball retainer 140 using the one or more connector tabs 175. The one or more connector tabs may mate with or fix to one or more connectors 159 on a valve body 150 or ball retainer 140. Connection between the blown-in dip tube connector 160 and the valve body 150 or ball retainer 140 may be fixed or moveable.

According to various embodiments of the invention, a blown-in dip tube connector 160 may also include a dip tube lock 168 as illustrated in FIGS. 9 through 15. Unlike conventional blown-in dip tube connections, the inclusion of a dip tube lock 168 on a blown-in dip tube connector 160 may improve the sealing of the blown-in dip tube connector 160 with a blown-in dip tube. For example, a blown-in dip tube may include a detent, raised ridge, or other feature configured to mate with the dip tube lock 168. When inserted into a blown-in dip tube, the dip tube lock 168 may snap to or fit with a feature that helps to prevent removal of the blown-in dip tube 160 therefrom. In some embodiments of the invention, one or more seal rings 163 may also be combined with a dip tube lock 168 to improve the connection, seal, or connection and seal between a blown-in dip tube and a blown-in dip tube connector 160.

Figure 24:
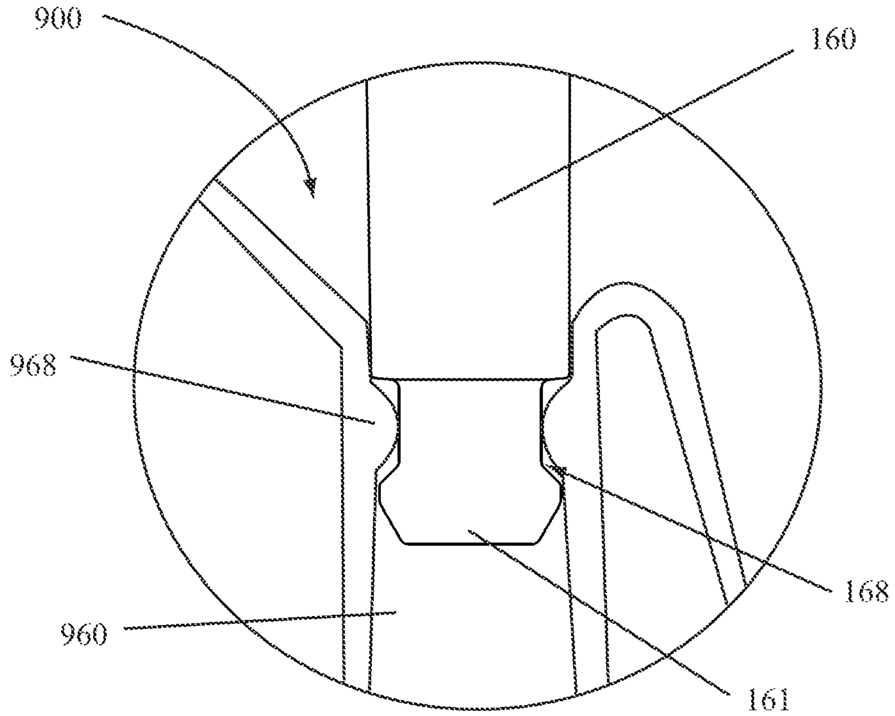
FIG. 24 illustrates a close-up view of a connection between the blown-in dip tube connector illustrated in FIG. 15 and a blown-in dip tube according to various embodiments of the invention.

An example of a connection between a blown-in dip tube 960 of a container or bottle 900 with a blown-in dip tube connector 160 having a dip tube lock 168 is illustrated in FIG. 24. In particular, FIG. 24 illustrates a detailed portion of the blown-in dip tube connector 160 circled in FIG. 15 in communication with a bottle 900. As illustrated, the dip tube lock 168 may snap fit with a detent 968, rim, or other feature of the blown-in dip tube 960 such that the blown-in dip tube connector 160 is secured to the blown-in dip tube 960. In some embodiments, the detent 968 and dip tube lock 168 may be configured such that once attached, the detent 968 and dip tube lock 168 will not separate without damaging the blown-in dip tube 960 or blown-in dip tube connector 160 such that they may not be reused. In other embodiments, the dip tube lock 168 and detent 968 may be configured to allow the blown-in dip tube connector 160 to be removed from the blown-in dip tube 960 and reassembled at a later time. For instance, such configuration may be desirable in those instances where a bottle 900 is to be re-filled and the pump system 100 reused with the bottle 900.

Figure 11:
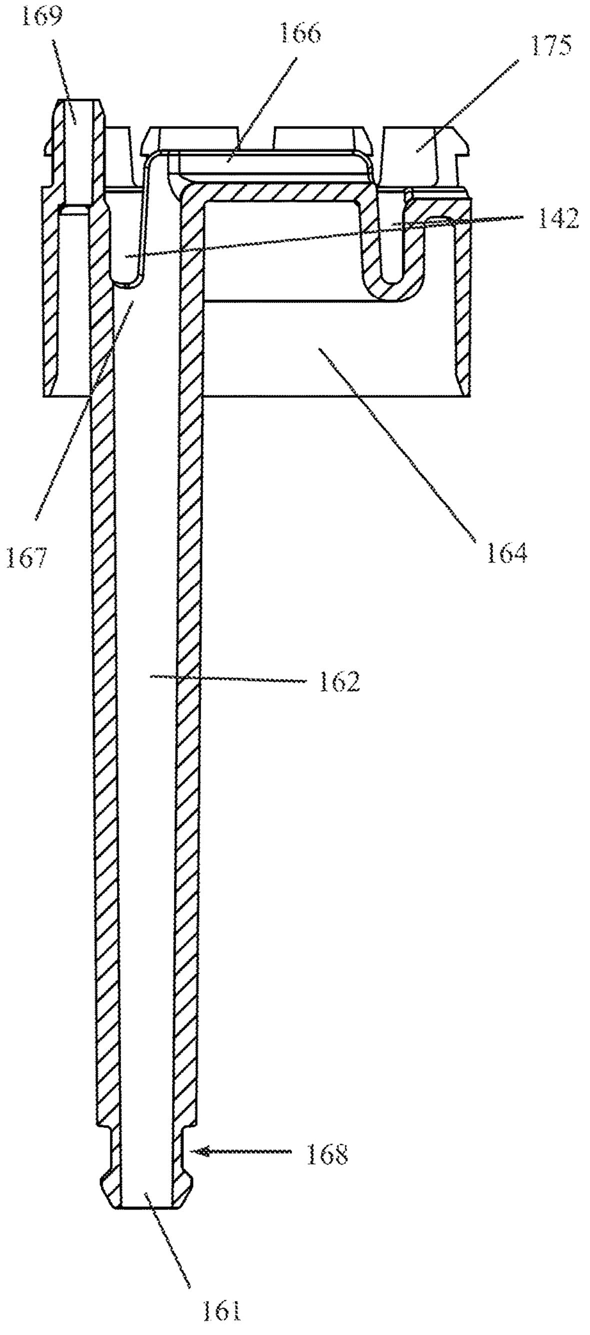
FIG. 11 illustrates a cross-sectional view of a blown-in dip tube connector according to various embodiments of the invention.
Figure 12:
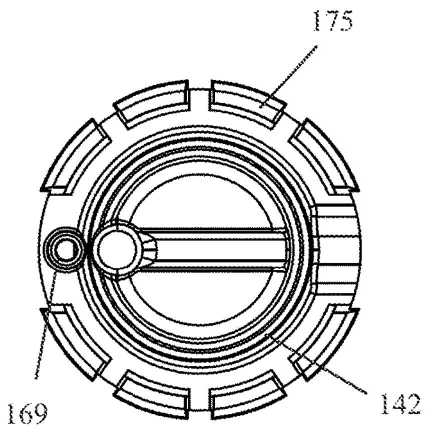
FIG. 12 illustrates a top view of a blown-in dip tube connector according to various embodiments of the invention.
Figure 13:
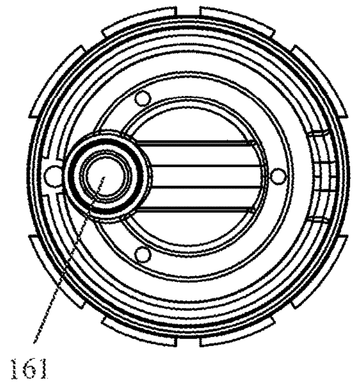
FIG. 13 illustrates a bottom view of a blown-in dip tube connector according to various embodiments of the invention.
Figure 14:
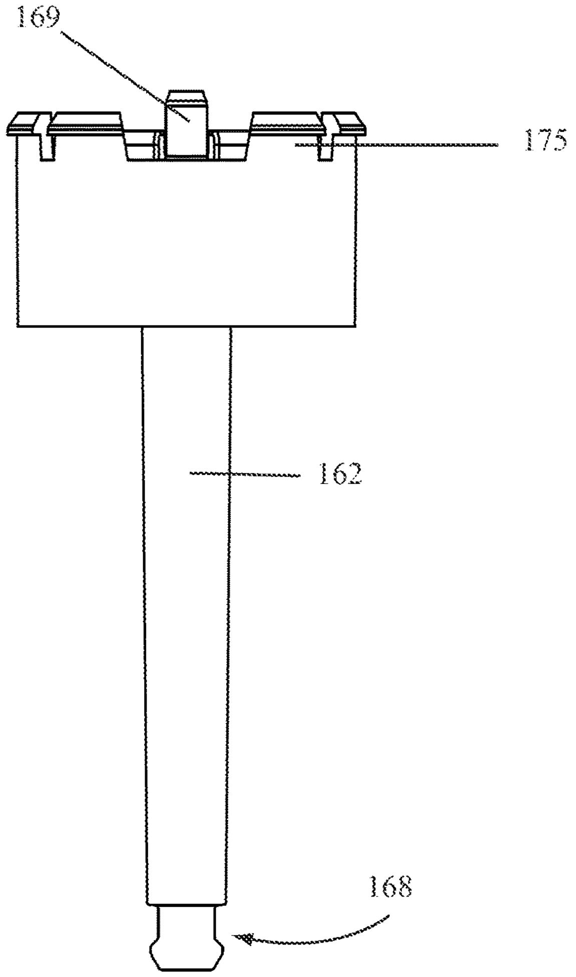
FIG. 14 illustrates a front view of a blown-in dip tube connector according to various embodiments of the invention.
Figure 15:
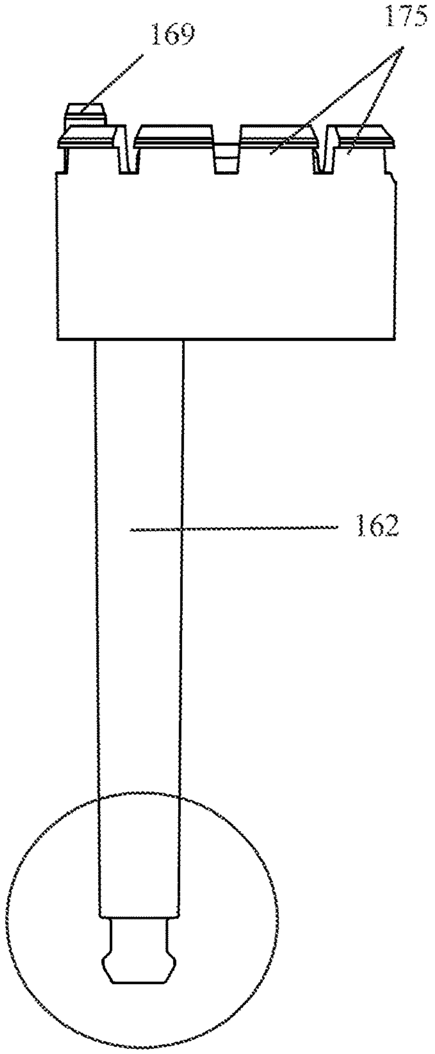
FIG. 15 illustrates a side view of a blown-in dip tube connector according to various embodiments of the invention.

As illustrated in FIGS. 11 and 12, a blown-in dip tube connector 160 may also include a trough 142 within at least a portion of the connector head 164. The trough may be configured to mate with, connect to, or otherwise seal with a ball retainer 140 as illustrated in FIG. 2. A ball retainer 140 may be snap fit into the blown-in dip tube connector 160 such that the blown-in dip tube 160 and ball retainer 140 may be shipped as a single unit or used as a single unit during an assembly process.

Figure 16:
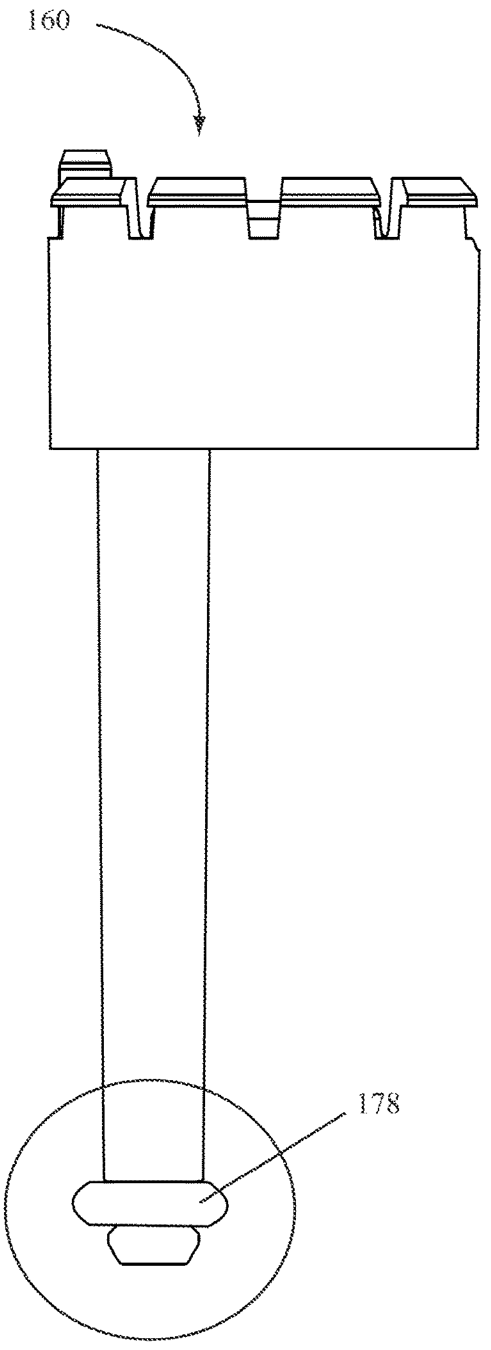
FIG. 16 illustrates a side view of a blown-in dip tube connector according to various embodiments of the invention.
Figure 17:
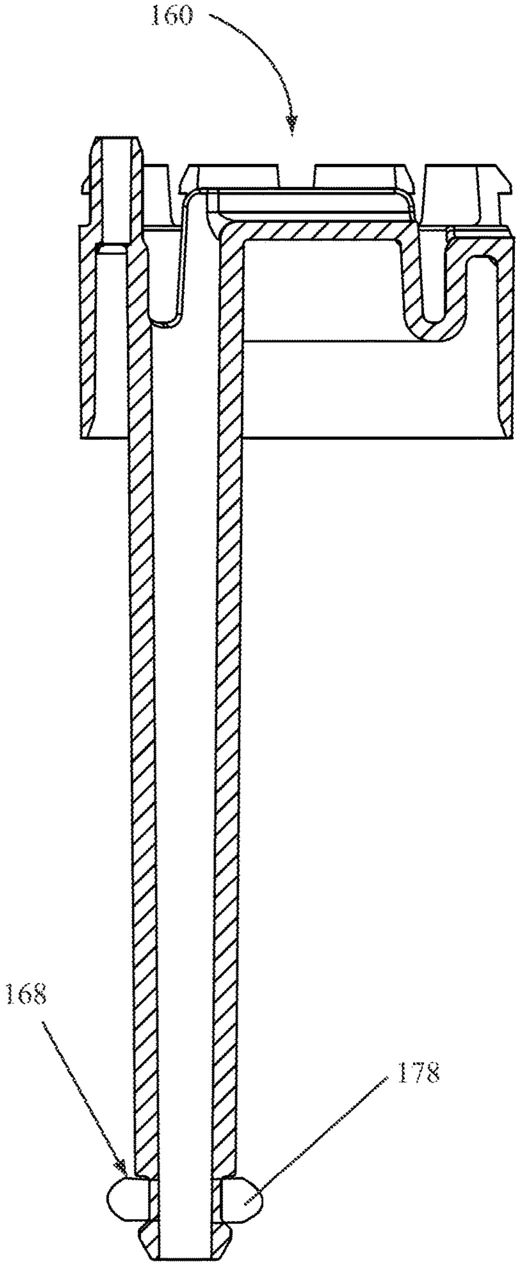
FIG. 17 illustrates a cross-sectional view of a blown-in dip tube connector according to various embodiments of the invention.
Figure 18:
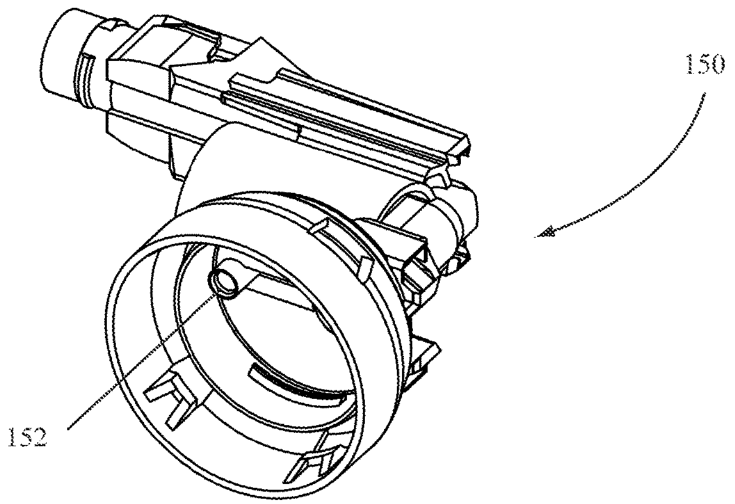
FIG. 18 illustrates a perspective view of a valve body according to various embodiments of the invention.
Figure 19:
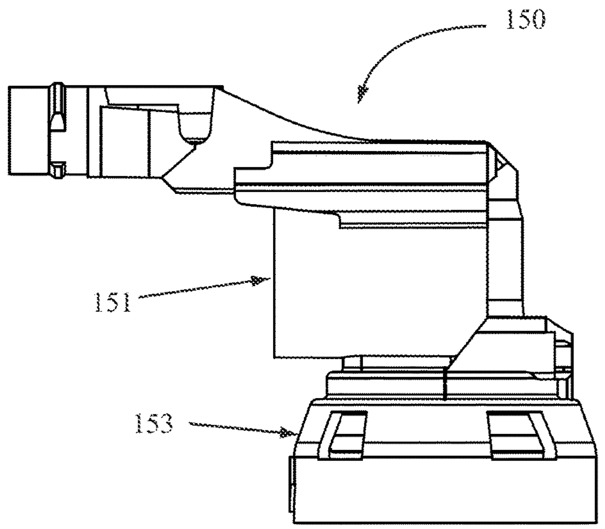
FIG. 19 illustrates a side view of a valve body according to various embodiments of the invention.
Figure 20:
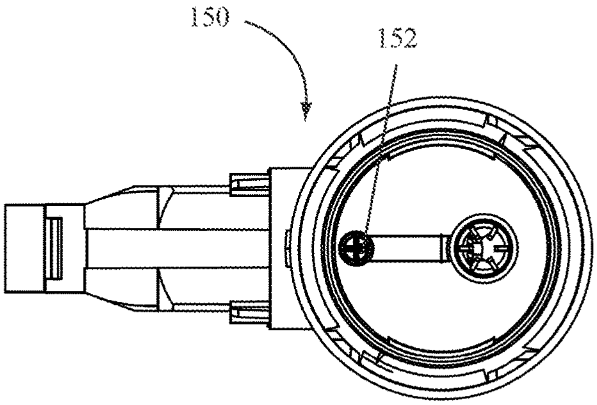
FIG. 20 illustrates a bottom view of a valve body according to various embodiments of the invention.
Figure 21:
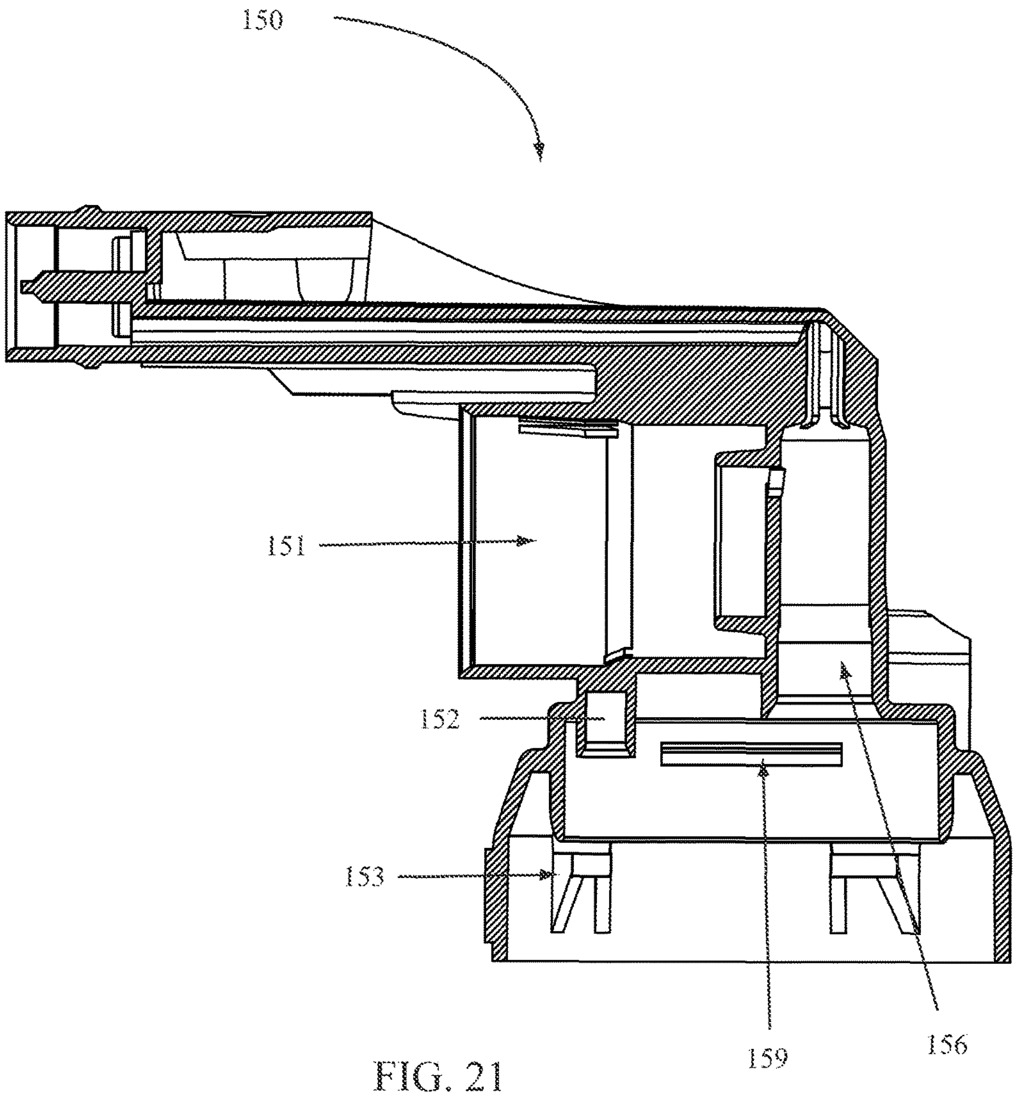
FIG. 21 illustrates a cross-sectional view of a valve body according to various embodiments of the invention.

A blown-in dip tube connector 160 according to still other embodiments of the invention is illustrated in FIGS. 16 and 17. As illustrated, the dip tube lock 168 feature of a blown-in dip tube connector 160 may be fitted with an o-ring 178 or other sealing device to facilitate a seal between the blown-in dip tube connector 160 and a blown-in dip tube. In addition, the ability to add an o-ring 178 or other sealing device to a dip tube lock 168 allows a blown-in dip tube connector 160 as illustrated in FIGS. 9 through 15 to be used with either a blown-in dip tube having a feature to mate with a dip tube lock 168 or a blown-in dip tube where such a feature does not exist.

Figure 25:
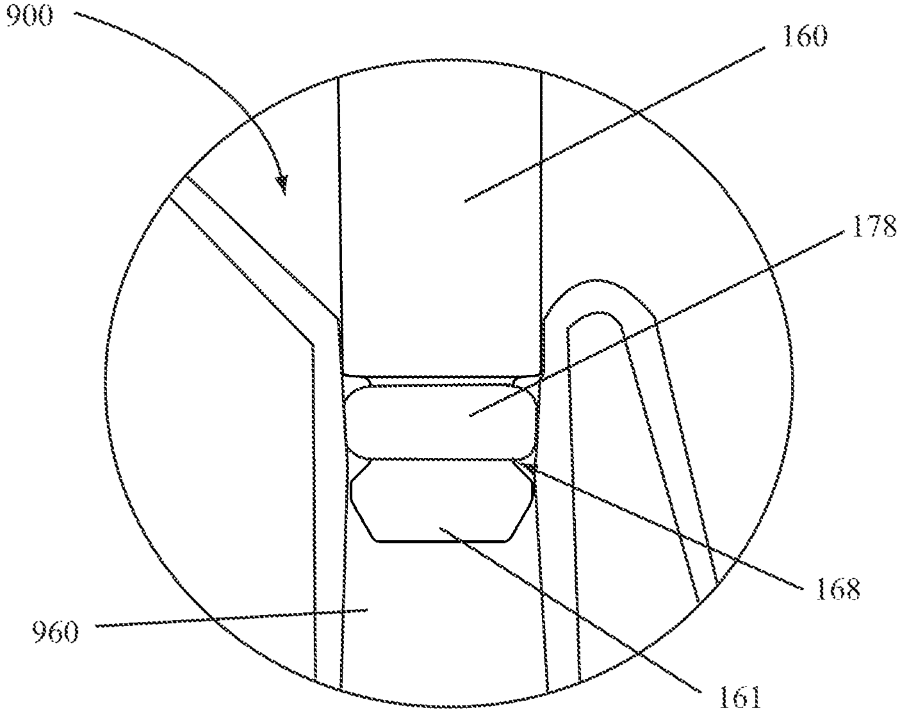
FIG. 25 illustrates a close-up view of a connection between the blown-in dip tube connector illustrated in FIG. 16 and a blown-in dip tube according to various embodiments of the invention.

For example, a detailed view of the blown-in dip tube connector 160 and o-ring 178 circled and illustrated in FIG. 16 is illustrated in FIG. 25. As illustrated, an o-ring 178 may be fitted on a dip tube lock 168 and the fluid inlet 161 end of the blown-in dip tube connector 160 may be inserted into a blown-in dip tube 960 of a bottle 900. At least a portion of the o-ring 178 may mate with the walls of the blown-in dip tube 960 and provide a seal therewith to improve the function of the connection between the blown-in dip tube connector 160 and the blown-in dip tube 960. In other embodiments of the invention, a blown-in dip tube 960 may also include additional features which may mate with an o-ring 178 or provide additional connectivity or retention between the o-ring 178 and the blown-in dip tube 960.

Figure 22:
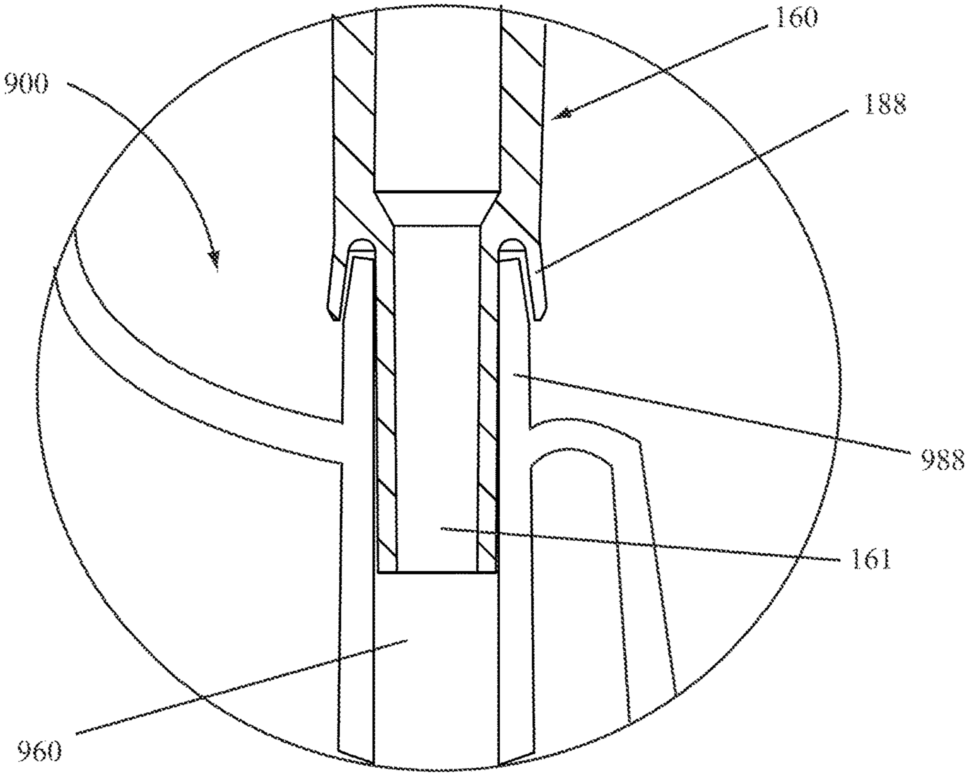
FIG. 22 illustrates a close-up view of a connection between the blown-in dip tube connector illustrated in FIG. 2 and a blown-in dip tube according to various embodiments of the invention.

According to still other embodiments of the invention, a blown-in dip tube connector 160 may include a dip tube lip 188 configured to mate with a blown-in dip tube as illustrated in FIGS. 2 and 22. The circled portion of FIG. 2 is illustrated in FIG. 22. As illustrated, a container or bottle 900 may include a blown-in dip tube 960. The blown-in dip tube 960 may include a blown-in dip tube lip 988 extending from the bottle 900. When a blown-in dip tube connector 160 is assembled or fitted to the bottle 900, a fluid inlet 161 portion of the blown-in dip tube connector 160 may extend into a portion of a blown-in dip tube 960 and the dip tube lip 188 may rest on, mate with, or seal to the blown-in dip tube lip 988. In such an embodiment, a seal may be formed between the fluid inlet 161 and the blown-in dip tube 960, between the dip tube lip 188 and the blown-in dip tube lip 988, or both the fluid inlet 161 and blown-in dip tube 960 and the dip tube lip 188 and the blown-in dip tube lip 988.

According to certain embodiments of the invention, a blown-in dip tube connector 160 may be made of any desirable material. For example, a blown-in dip tube connector 160 may be made of a plastic material. In some embodiments, a blown-in dip tube connector may be made of a polyethylene material. For example, in some embodiments, a blown-in dip tube connector 160 may be made of High-density polyethylene (HDPE). In other embodiments, a blown-in dip tube connector 160 may be made of Medium-density polyethylene (MDPE). In still other embodiments, a blown-in dip tube connector 160 may be made of a material that allows the blown-in dip tube connector 160 to flex such that if a bayonet-type connection between a pump system 100 and bottle 900 is used, removal of the pump system 100 may be facilitated by the ability of the blown-in dip tube connector 160 to flex during removal of the pump system 100 from the bottle 900. For example, as a bayonet connection is removed from a bottle 900, the valve body 150 is typically twisted off of the bottle 900. As the valve body 150 is twisted, the fluid flow path 162 portion of the blown-in dip tube connector 160 may flex allowing the valve body 150 to twist to release the bayonet connection while maintaining a seal or connection between the blown-in dip tube connector 160 and a blown-in dip tube 960.

While various embodiments of the invention are illustrated with a blown-in dip tube connector 160 mated with a valve body 150, a blown-in dip tube connector 160 may also be fitted with or retained by connection with a ball retainer 140. For example, connectors on a ball retainer 140 may mate with or fit with the connectors on the blown-in dip tube connector 160 such that the blown-in dip tube connector 160 and ball retainer 140 snap together. Assembly of the ball retainer 140 and blown-in dip tube connector 160 with a valve body 150 may be made by snap fitment of the ball retainer 140 with the valve body 150, snap fitment of the blown-in dip tube connector 160 with the valve body 150, both snap fitment of the ball retainer 140 and blown-in dip tube connector 160 with the valve body 150 or through other conventional fitment or retention systems.

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. A blown-in dip tube connector for connecting a blown-in dip tube of a container with a fluid passageway of a trigger sprayer, said blown-in dip tube connector comprising:

a fluid inlet, a fluid outlet, and a fluid flow path between the fluid inlet and fluid outlet;

a connector head about the fluid outlet;

a fluid chamber within the connector head in communication with the fluid outlet;

at least one connector lip about a periphery of the connector head;

at least one seal on an exterior surface of the fluid inlet end wherein the at least one seal is frustoconical in shape;

said blown-in dip tube connector being formed from a polymer material;

said at least one seal being formed from an elastomeric material selected from the group consisting of a thermoplastic elastomer, a thermoplastic urethane, a thermoplastic polyurethane and silicone; and wherein the at least one connector lip retains the blown-in dip tube connector with the trigger sprayer and the at least one seal seals with the blown-in dip tube of the container.

2. The blown-in dip tube connector of claim 1 wherein:

said fluid inlet has a first diameter which is smaller than a diameter of said fluid flow path.

3. The blown-in dip tube connector of claim 1 wherein:

said at least one seal has a seal lip which has a diameter which is larger than said diameter of said flow path.

4. The blown-in dip tube connector of claim 2 wherein:

said at least one seal has a seal lip which has a diameter which is larger than said diameter of said flow path.

* * * * *